United States Patent
Sos-Munoz et al.

(10) Patent No.: US 10,275,224 B1
(45) Date of Patent: Apr. 30, 2019

(54) JUST IN TIME GENERATION SYSTEM

(71) Applicant: InvestCloud Inc, West Hollywood, CA (US)

(72) Inventors: Vicent Sos-Munoz, Beverly Hills, CA (US); John W. Wise, West Hollywood, CA (US)

(73) Assignee: InvestCloud Inc, West Hollywood, CA (US)

( * ) Notice: Subject to any disclaimer, the term of this patent is extended or adjusted under 35 U.S.C. 154(b) by 0 days.

(21) Appl. No.: 15/927,953

(22) Filed: Mar. 21, 2018

(51) Int. Cl.
*G06F 8/33* (2018.01)
*G06F 8/30* (2018.01)
*G06F 8/71* (2018.01)

(52) U.S. Cl.
CPC .............. *G06F 8/30* (2013.01); *G06F 8/33* (2013.01); *G06F 8/71* (2013.01)

(58) Field of Classification Search
CPC .............. G06F 8/71; G06F 8/30; G06F 8/33
USPC .......................................... 717/106, 121, 110
See application file for complete search history.

(56) References Cited

U.S. PATENT DOCUMENTS

| | | | | |
|---|---|---|---|---|
| 7,689,664 B2* | 3/2010 | Karlberg | .................. | G06F 8/61 709/203 |
| 9,826,031 B2* | 11/2017 | Sirota | ..................... | G06F 9/485 |
| 2006/0010163 A1* | 1/2006 | Herzog | ................. | G06Q 10/10 |
| 2010/0281243 A1* | 11/2010 | Herzog | ................. | G06Q 10/10 713/1 |
| 2015/0205595 A1* | 7/2015 | Dudai | ....................... | G06F 8/65 717/168 |
| 2017/0039078 A1* | 2/2017 | Chen | ................... | G06F 9/44505 |

* cited by examiner

*Primary Examiner* — Phillip H Nguyen
(74) *Attorney, Agent, or Firm* — Patent Ingenuity, P.C.; Samuel K. Simpson (57) ABSTRACT

A computer program product comprises a non-transitory computer useable storage device having a computer readable program. The computer readable program when executed on a computer causes the computer to receive location metadata and an initial request to access a software application from a location identified by the location metadata. Further, the computer is caused to determine a configuration of the software application that complies with a plurality of rules associated with execution of the software application at the location. In addition, the computer is caused to generate the configuration after the request to access the software application. The computer is also caused to provide the configuration to the location so that the configuration is accessed. A system may also perform the process executed by the computer readable program.

18 Claims, 8 Drawing Sheets

| Configuration No. | Location | Configuration Parameters | Entity Requirements | Jurisdictional Requirements | Locale Requirements |
|---|---|---|---|---|---|
| 1 | A | Color Scheme A, Functionality A | Entity X Format | Privacy | English |
| 2 | B | Color Scheme A, Functionality B | Entity Y Format | Fee Disclosure | Spanish |
| ......... | ......... | ......... | ......... | ......... | ......... |
| n | Z | Color Scheme n, Functionality n | Entity Y Format | Privacy | German |

JUST IN TIME GENERATION SYSTEM

BACKGROUND

1. Field

This disclosure generally relates to the field of computing systems. More particularly, the disclosure relates to software application code generation.

2. General Background

Configuring (i.e., establishing initial parameters, settings, functionalities, etc.) a software application is often not a one-size-fits-all process. In other words, a software application is typically pre-generated according to one of numerous configurations based on various criteria such as, but not limited to, geographical location. For example, a website may be developed to provide a particular service, but different configurations of that website have to be deployed in the different human-spoken languages native to the geographical locations of the computing systems using the website. In addition, various sub-regions may have differing regulations (e.g., privacy) that dictate additional configurations corresponding to those various sub-regions.

As a result, during the software application design phase, software developers often attempt to develop numerous configurations to account for each possible variation of the software application. However, developing a variation for each possible variation is often infeasible. For instance, the quantity of computing resources (e.g., processing capabilities, memory capacity, etc.) are often too limited to generate what may amount to many thousands of different variations of the same software application. Therefore, current systems do not effectively provide code generation of a software application.

SUMMARY

In one aspect of the disclosure, a computer program product is provided. The computer program product comprises a non-transitory computer useable storage device having a computer readable program. The computer readable program when executed on a computer causes the computer to receive location metadata and an initial request to access a software application from a location identified by the location metadata. Further, the computer is caused to determine a configuration of the software application that complies with a plurality of rules associated with execution of the software application at the location. In addition, the computer is caused to automatically generate the configuration after the request to access the software application. The computer is also caused to provide the configuration to the location so that the configuration is accessed. A system may also perform the process executed by the computer readable program.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

An access-based code generation system is provided to automatically generate code corresponding to a configuration of a software application upon a determination of an access request. In contrast with previous systems that attempt to pre-generate code for each possible configuration of a software application during the design phase, the access-based code generation system generates code for a configuration at the time of, or after, an access request. Accordingly, the access-based code generation system only generates code for a configuration when the configuration is actually deemed to be needed (e.g., upon an initial request by a user for that particular configuration).

Even though managing just one variable (e.g., geography) may be somewhat manageable for generating configurations, managing multiple intersecting variables (e.g., thirty different geographies for seven hundred different clients for five different products resulting in one hundred five thousand different possible variations) is quite expensive and too complex to configure. With the access-based code generation system, only those variable assortments that are actually used get generated, so in reality a much smaller set of code is generated.

Instead of wasting limited resources on developing configurations for a software application that may not be used in even a single instance, the access-based code generation system ensures that the generated configuration is requested to be utilized in at least one instance. In other words, the access-based code generation system automatically generates code for the subset of possible code variations that is actually requested.

Figure 1:
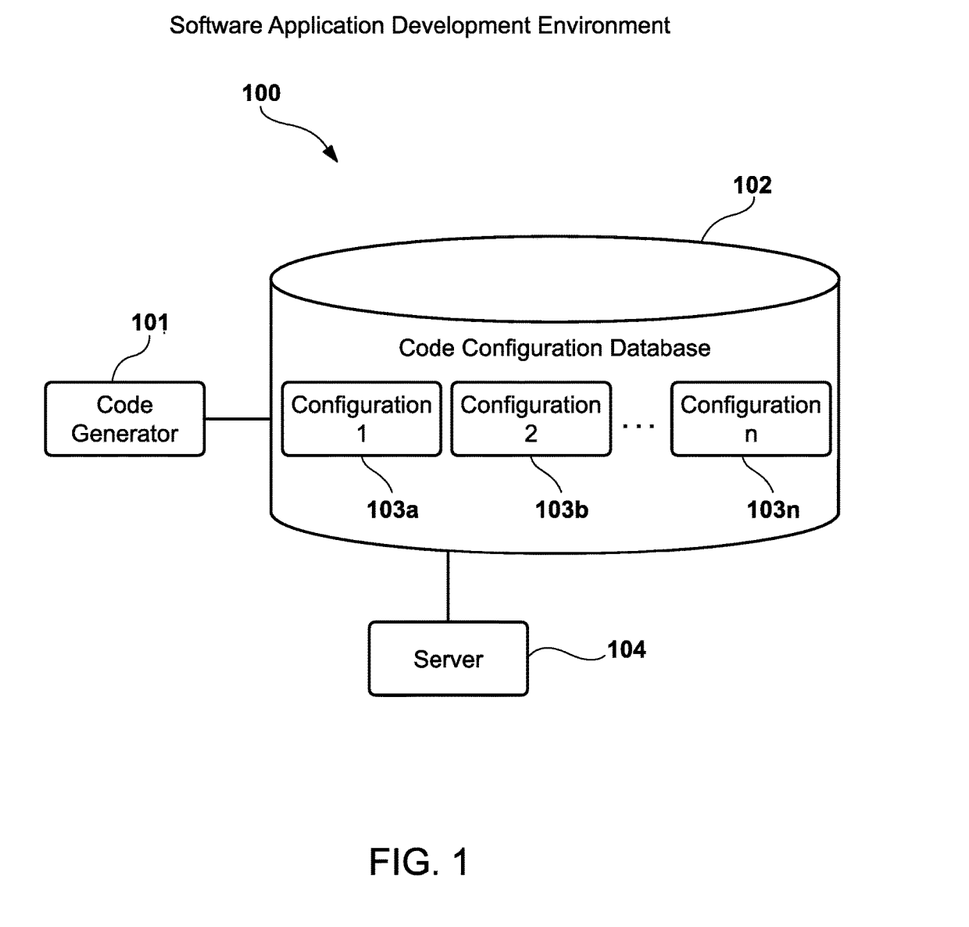
FIG. 1 illustrates a software application development environment that is used to pre-generate all possible configurations of a software application in a design phase.

FIG. 1 illustrates a software application development environment 100 that is used to pre-generate all possible configurations of a software application in a design phase. The software development environment 100 has a code generator 101 that is in operable communication with code configuration database 102. The code generator 101 pre-generates all of the possible configurations for a software application and stores those configurations in the code configuration database 102. For instance, during the design phase, application developers may determine that a software application (e.g., a website) has to be configured for seven hundred different entities according to the design specifications of those different entities, two different locale requirements (e.g., languages such as English and Spanish), and thirty different jurisdictional requirements (e.g., privacy regulations differing amongst countries); in this example, the code generator 101 would have to pre-generate forty-two thousand different configurations for storage in the code configuration database 102.

A server 104, in operable communication with the code configuration database 102, may obtain the different pre-generated configurations 103a-103n upon receiving requests for the pre-generated configuration corresponding to the location of a user. Yet, many of those pre-generated configurations 103a-103n may not be obtained by the server 104 at all as each possible theoretical variation does not necessarily correspond to an actual user. As a result, the code generator 101 may generate thousands of unutilized configurations. Further, the processing power, memory requirements, and other resources available for the code generator 101 typically do not suffice for pre-generating all of the possible configuration variations (e.g., forty-two thousand different configurations). Therefore, the software application development environment 100 may not be able to feasibly pre-generate all of the different configurations.

Figure 2:
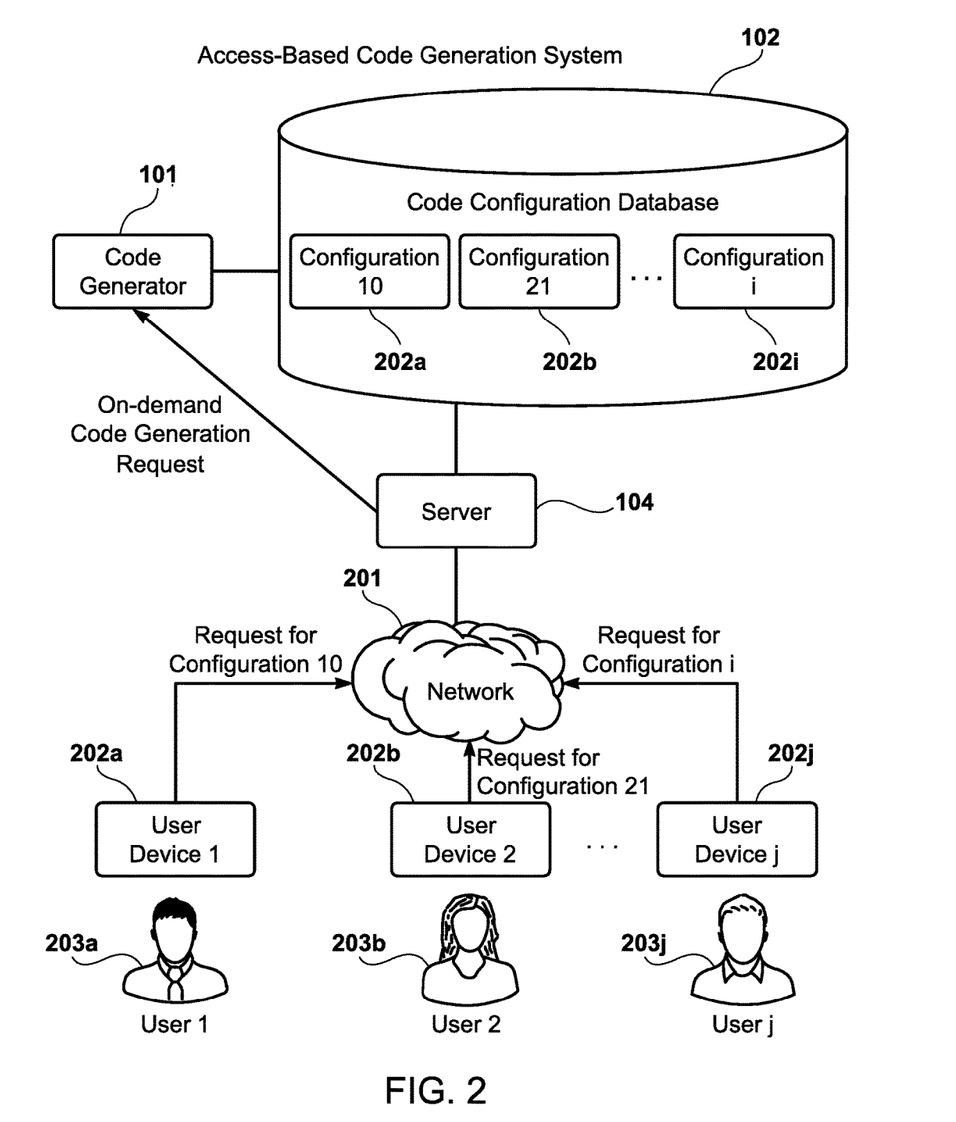
FIG. 2 illustrates an access-based code generation system that automatically generates code upon a determination of an access request.

FIG. 2 illustrates an access-based code generation system 200 that automatically generates code upon a determination of an access request. Instead of pre-generating code for configurations, the code generator 101 waits for an access request from a server 104 for a particular configuration before generating code for a configuration. In other words, the access-based code generation system 200 provides on-demand, or just-in-time, automatic generation of code for various configurations of a software application.

The server 104 may communicate, via a computerized network 201, with various user computing devices 202a-202j (e.g., personal computer, laptop, tablet device, smartphone, smartwatch, smart glasses, smart television, smart wearable device, kiosk, etc.) that each correspond to one of a plurality of users 203a-j. Prior to generating code for a configuration, the code generator 101 receives an access request for that particular configuration from the server 104, which received the access request from a particular user computing device. The code generator 101 may then generate code for the particular configuration of the software application. The particular configuration that was requested may then be stored by the code generator 101 in the code configuration database 102 so that the server 104 may retrieve that particular configuration and provide access to that configuration not only to the user that requested it, but also subsequent users requesting that same configuration. In other words, the code generator 101 does not have to regenerate a configuration that has already been requested. The first instance of a particular configuration may be obtained by the server 104 either indirectly via the code configuration database 102 or directly from the code generator 101; whereas subsequent instances are obtained from the code configuration database 102 as initial code generation for subsequent instances is not necessary.

In contrast with the software application development environment 100 that pre-generates all possible configuration variations, the access-based code generation system 200 performs on-demand, access-based code generation. As a result, the code configuration database 102 illustrated in FIG. 2 only stores a subset of all of the possible code variations. For example, user 203a may utilize user computing device 202a to request configuration number 10, user 203b may utilize user computing device 202b to request configuration number twenty one, and user 203j may utilize user computing device 202j to request configuration number j; upon receiving requests for these particular configurations, the code generator 101 performs on-demand code generation of these configurations for storage in the code configuration database 102. As a result, only a subset of all of the possible configurations 103a-103n is stored by the code configuration database 102 illustrated in FIG. 2.

By storing less than all of the possible configurations 103a-103n, the access-based code generation system 200 has reduced memory requirements when compared with the software application development environment 100 illustrated in FIG. 1. Further, the search time for a particular configuration is reduced since the subset of all of the possible configurations 103a-103n may have a significantly smaller quantity of configurations to search through when compared with the entire set of all possible configurations 103a-103n. Therefore, the access-based code generation system 200 improves the functioning of a computer by reducing memory requirements and improving search time.

Figure 3:
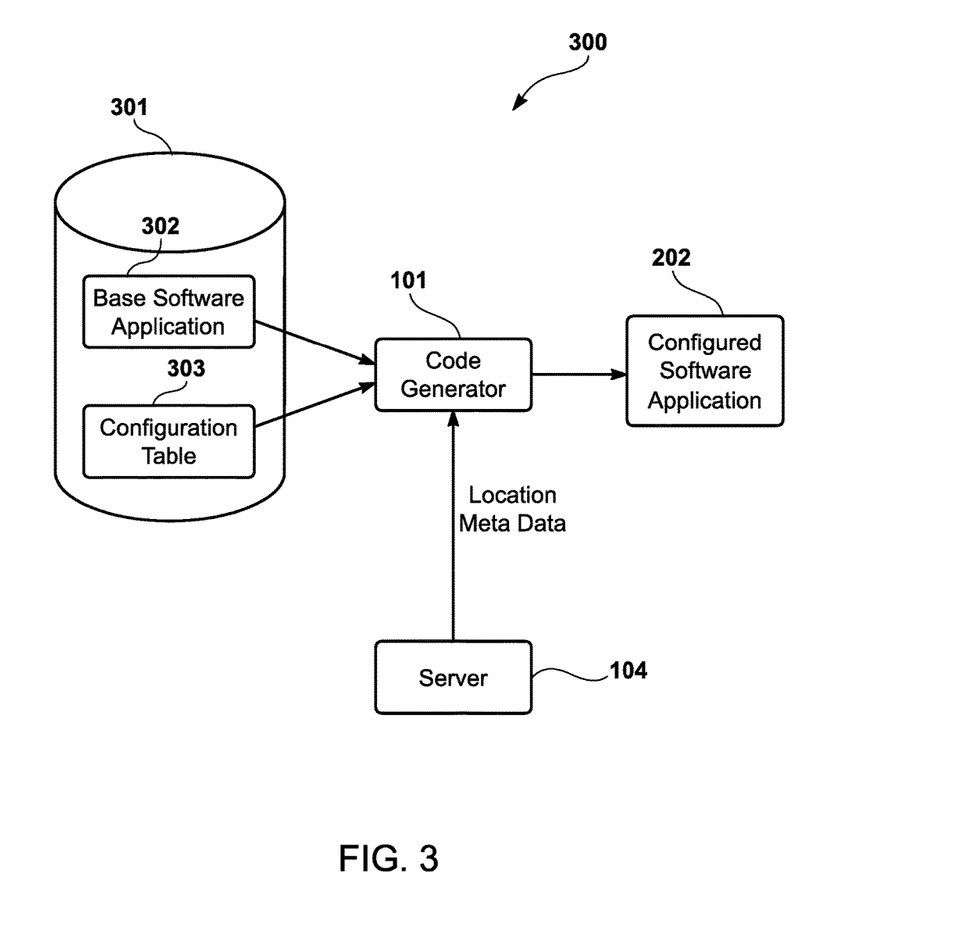
FIG. 3 illustrates the inputs to, and the output of, the code generator of the access-based code generation system illustrated in FIG. 2.

FIG. 3 illustrates the inputs to, and the output of, the code generator 101 of the access-based code generation system 200 illustrated in FIG. 2. The code generator 101 obtains a base software application 302 from a database 301 or from a computer readable storage device. The base software application 302 has core functionality that is common to any of the configurations 202a-202i illustrated in FIG. 2. For example, the base software application 302 may be a website that provides a secure communication session with a financial advisor; irrespective of any configuration, that core functionality remains constant.

Further, the code generator 101 obtains a configuration table 303 from the database 301 or from a computer readable storage device. The configuration table 303 provides data that informs the code generator 101 on how the code generator 101 is supposed to configure the base software application 302 for a given set of variables (e.g., entity preferences, jurisdictional requirements, and locale). The code generator 101 may then modify, add, or delete code from the base software application 302 to comply with requirements associated with the variables.

In addition, the code generator 101 may receive location metadata and entity identifier data from the server 104. The location metadata provides geographical location data for the user computing device 203 requesting the configured software application 202. The code generator 101 may then perform a search of the configuration table 303 to determine customization criteria corresponding to the location and the entity whose website is associated with the access request. After determining a match, the code generator 101 automatically modifies the behavior of the base software application 302 to comply with the requirements associated with the variables.

Figure 4:
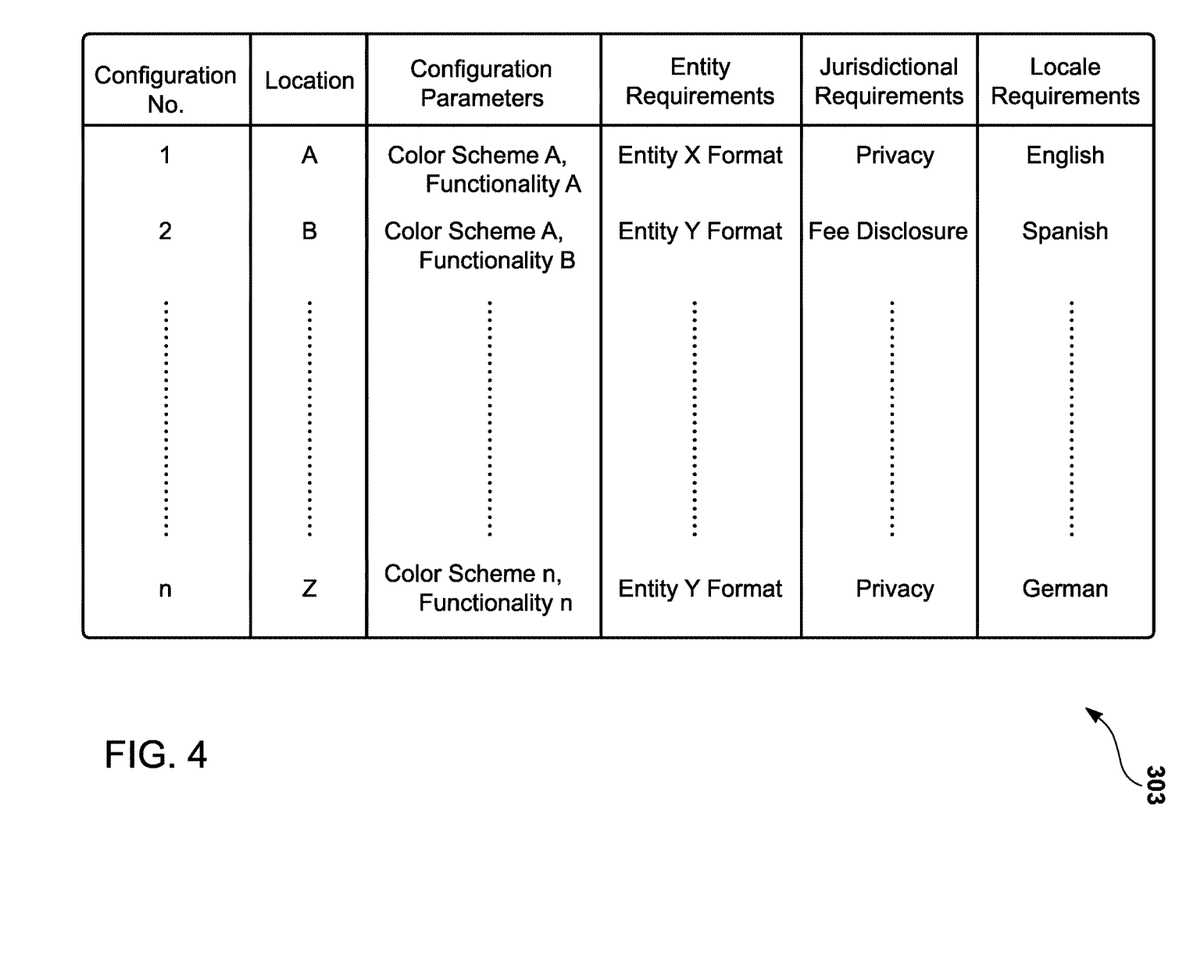
FIG. 4 illustrates an example of the configuration table illustrated in FIG. 3.

FIG. 4 illustrates an example of the configuration table 303 illustrated in FIG. 3. The configuration table 303 illustrates a list of configurations assorted by configuration number and associated fields. For example, each configuration identifier may be associated with a location and a plurality of variables, such as configuration parameters (e.g., functionality, aesthetics, etc. associated with the location), entity requirements (e.g., functionality and/or format features for an entity associated with the configured software application), jurisdictional requirements (e.g., privacy regulations, disclosures), and locale requirements (e.g., languages), that each correspond to the location. Accordingly, the code generator 101 (FIG. 3) may retrieve the data associated with a particular configuration and configure the base software application 302 according to the configuration parameters associated with the particular location of the user 203 (FIG. 2). In other words, the configuration table 303 may be searched according to location to determine the configuration parameters associated with that location so that the code generator 101 may perform an on-demand code generation for that configuration at the time of, or after, an access request.

As the configuration table 303 stores only the subset of all possible configurations and is searchable based on location, the configuration table 303 allows the server 104 perform a faster search of the code configuration database illustrated in FIG. 2. Therefore, the configuration table 303 improves the functioning of a computer.

Figure 5A:
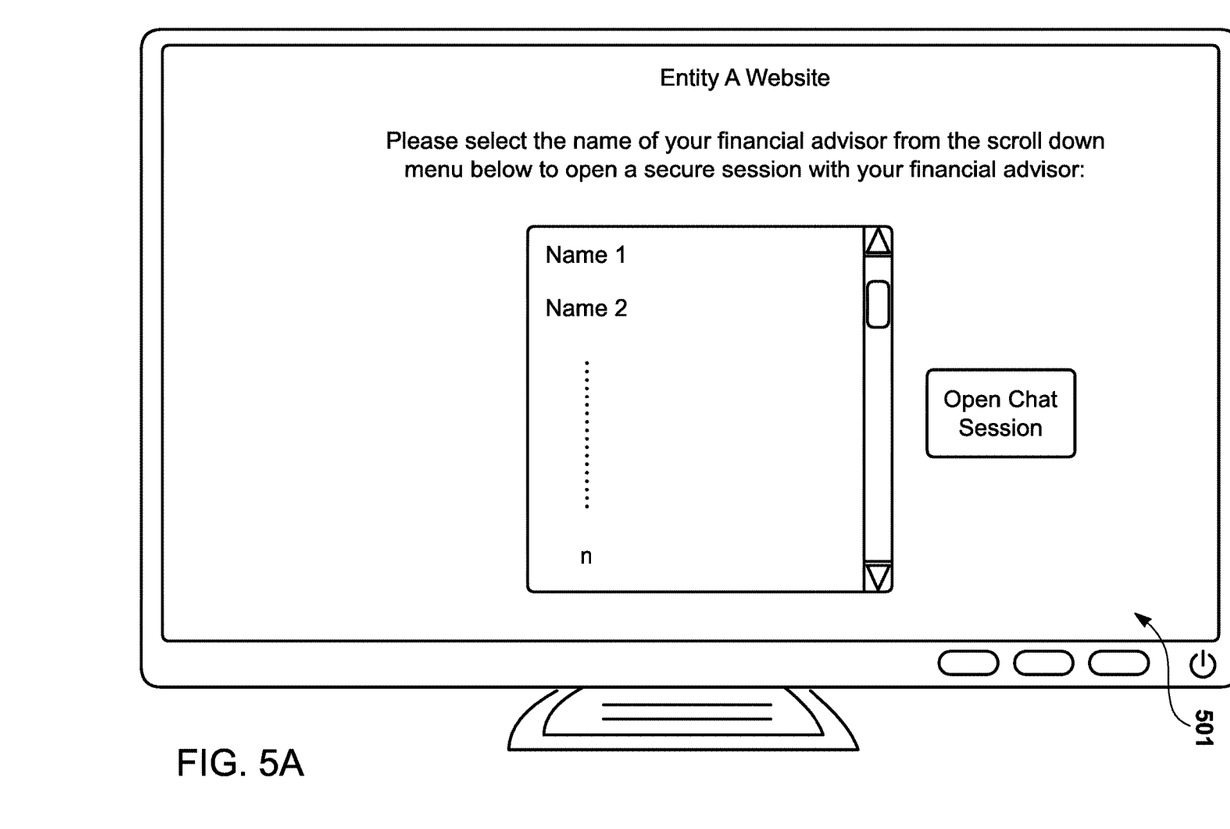
FIG. 5A illustrates an example of the base software application illustrated in FIG. 3 being modified for a user in a first location that requests access to a configuration of the base software application that is associated with entity A.
Figure 5B:
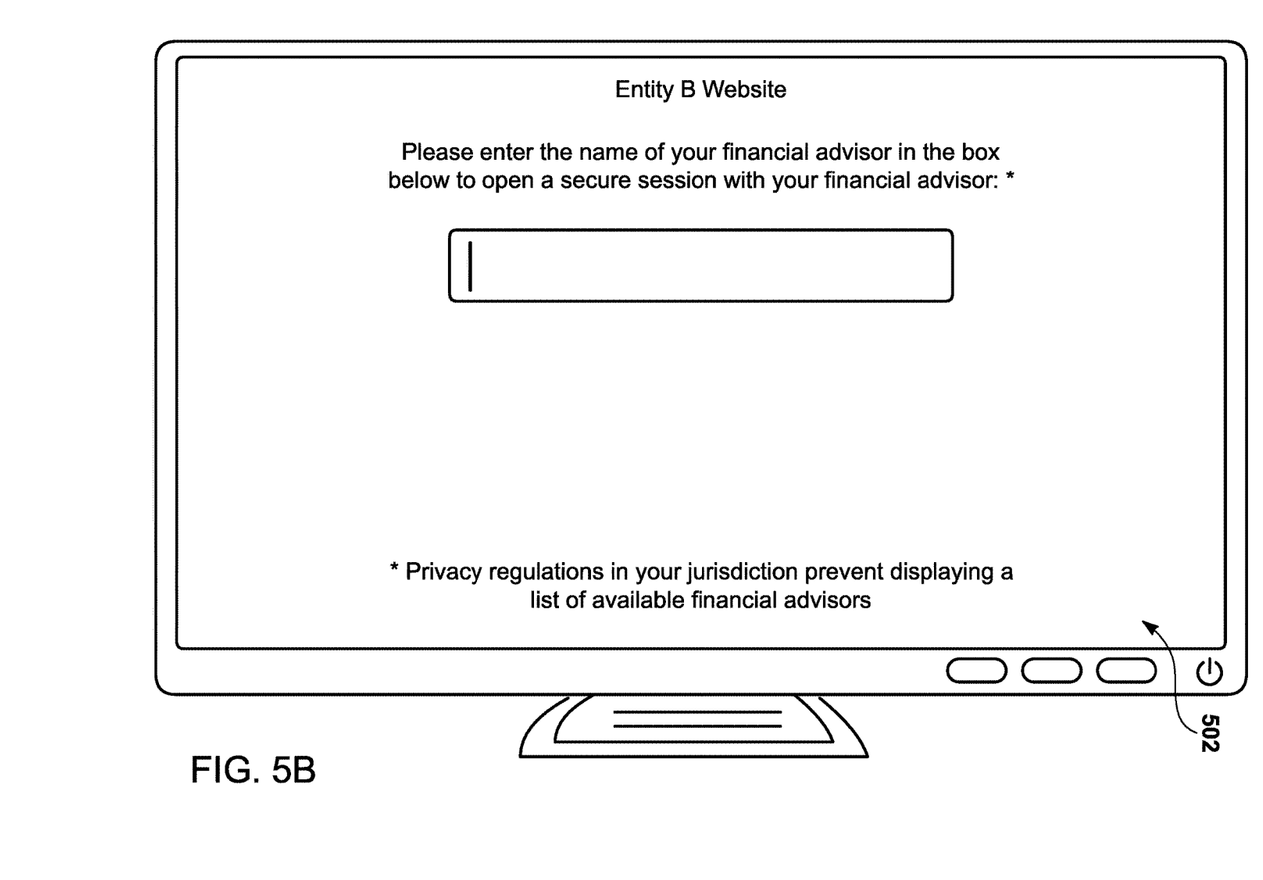
FIG. 5B illustrates another example of the base software application illustrated in FIG. 3 being modified for a user in a second location that requests access to a configuration of the base software application that is associated with entity A.

FIGS. 5A and 5B illustrate various examples of the base software application 302 illustrated in FIG. 3 as configured for a user 203 based on the location of the user. For instance, the base software application 302 may be a financial advisor program that establishes a secure communication session between a user 203 and a financial advisor; the functionality and aesthetic features of that secure communication session may have to be modified based on the location of the user 203 requesting access to the financial advisor program and/or the entity for which the website is generated.

FIG. 5A illustrates an example of the base software application 302 illustrated in FIG. 3 being modified for a user in a first location that requests access to a configuration of the base software application 302 that is associated with entity A. Given the functionality and aesthetic feature requirements of a user located in jurisdiction A, the code generator 101 generates a first configuration 501 that depicts a scroll-down menu from which a user 203 is allowed to select the name of a financial advisor with whom the user attempts to establish a secure communication session.

FIG. 5B illustrates another example of the base software application 302 illustrated in FIG. 3 being modified for a user in a second location that requests access to a configuration of the base software application 302 that is associated with entity A. Given that the jurisdictional requirements may be different for the second location than the first location, the code generator 101 modifies the base software application 302 in a different manner than the first configuration 501 illustrated in FIG. 5A; instead, the code generator 101 modifies the based software application 302 according to a second configuration 502. For example, the second configuration 502 may have certain privacy regulations that prevent display of a list of financial advisors. Accordingly, the second configuration 502 may display an input box in which the user has to input the name of the financial advisor. Even though the appearance of the first configuration 501 and the second configuration 502 may have a different appearance, the first configuration 501 and the second configuration 502 are different configurations for the same entity A.

The code generator 101 is not limited to modifying the behavior of the base software application 302 for a single entity; in other words, as illustrated by the configuration table 303, the code generator 101 may be utilized to modify the behavior for different entities with different entity requirements.

Figure 6:
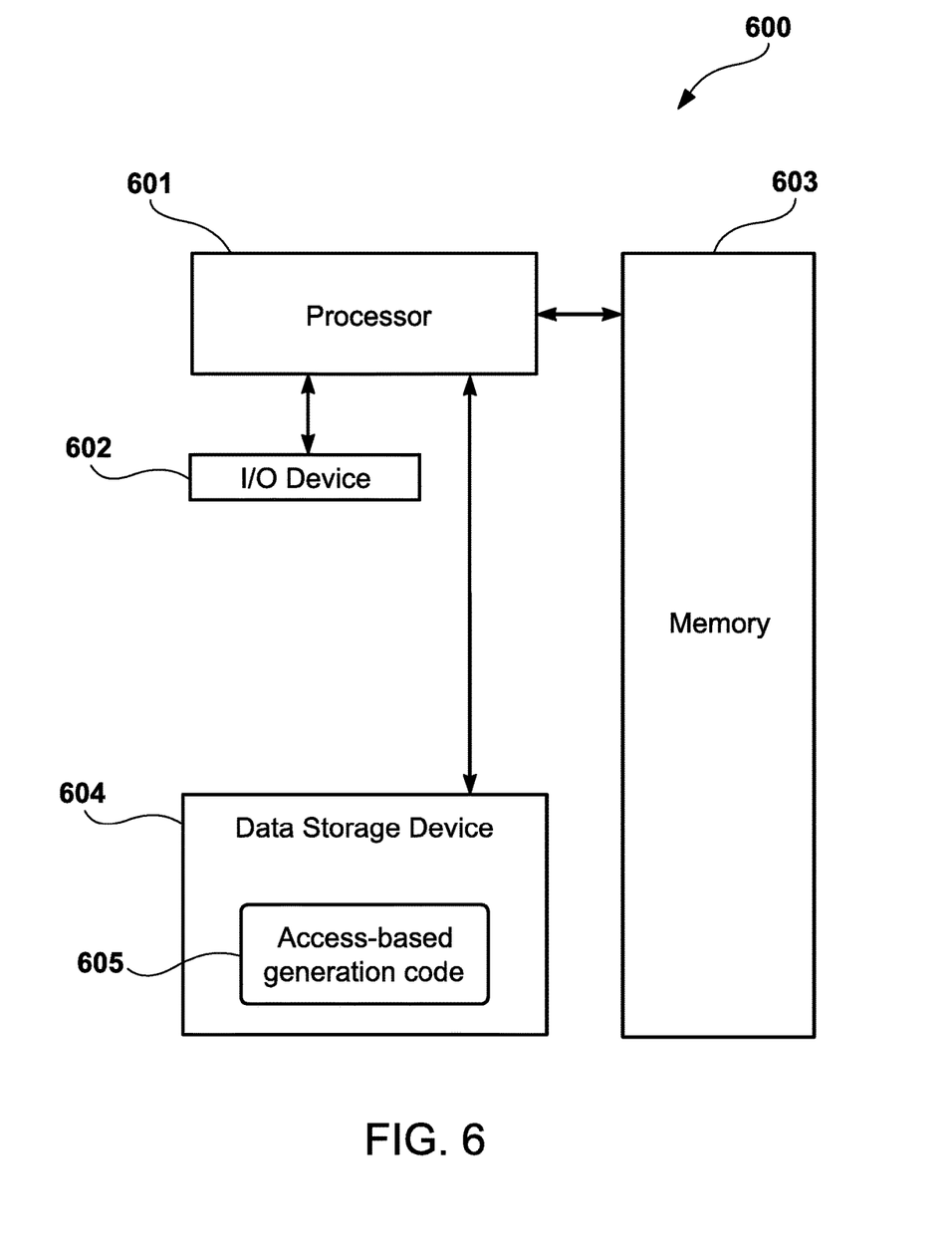
FIG. 6 illustrates the internal components of the code generator and/or a system that implements the code generator.

FIG. 6 illustrates the internal components of the code generator 101 and/or a system that implements the code generator 101. In one embodiment, the code generator 101 is implemented utilizing a specialized computer or any other hardware equivalents. Thus, the code generator 101 has a processor 601, a memory 603 (e.g., random access memory and/or read only memory), access-based generation code 605, a data storage device 604 that stores the access-based generation code 605, and various input/output ("I/O") devices 602 (e.g., audio/video outputs, audio/video inputs, a receiver, a transmitter, a speaker, a display, an image capturing sensor, a clock, an output port, a user input device, etc.).

Figure 7:
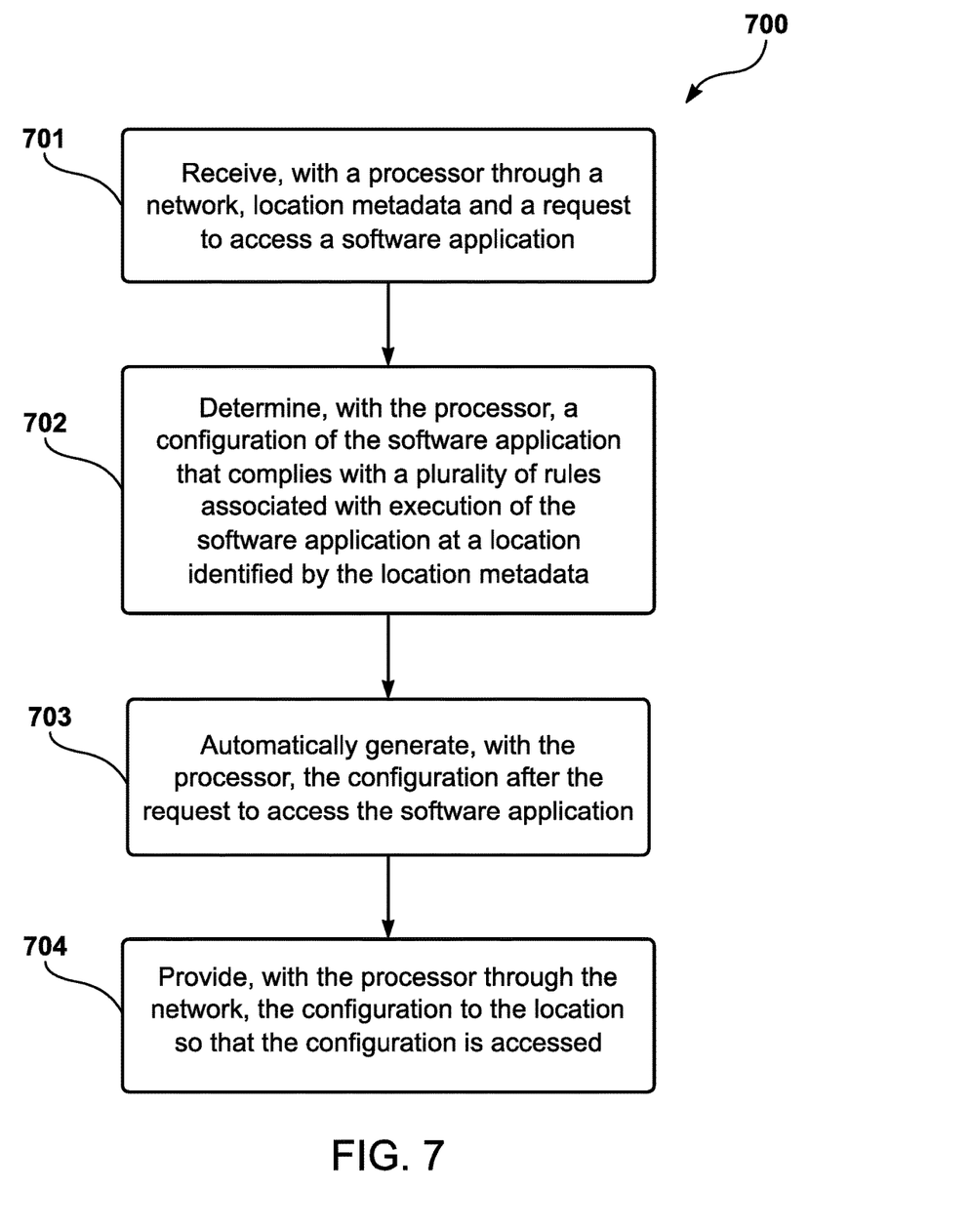
FIG. 7 illustrates a process that may be utilized by the code generator illustrated in FIG. 1.

FIG. 7 illustrates a process 700 that may be utilized by the code generator 101 illustrated in FIG. 1. At a process block 701, the process 700 receives location metadata and an initial request to access a software application from the location. Further, at a process block 702, the process 700 determines a configuration of the software application that complies with a plurality of rules associated with execution of the software application at a location identified by the location metadata. In addition, at a process block 703, the process 700 automatically generates, with the processor, the configuration after the request to access the software application. At a process block 704, the process 700 provides, with the processor through the network, the configuration to the location so that the configuration is accessed.

Although the processes described herein have been exemplified via a website software application, the processes may be implemented via other types of software applications. For example, a mobile application that generates location-specific data (e.g., sales tax for a particular jurisdiction) may be implemented according to such processes.

Further, the processes described herein may be implemented to be utilized without location metadata or location-specific requirements. For instance, the processes described herein may be utilized to modify the behavior of a software application based on the entity associated with the software application irrespective of location. For example, the base software application may be modified on-demand via an initial access request for the configuration of a website according to a particular entity (i.e., by inputting that entity's website address into a computing device). Accordingly, various types of criteria other than location-specific criteria may be utilized to modify behavior of a software application.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A computer program product comprising a non-transitory computer useable storage device having a computer readable program, wherein the computer readable program when executed on a computer causes the computer to:
receive, with a processor through a network from a user computing device, geographical location metadata and an initial request to access a software application from the user computing device at a geographical location corresponding to the geographical location metadata;
automatically generate, with the processor, a new configuration after the request to access the software application without pre-generating the new configuration prior to the initial request, without pre-generating a new configuration of a third party software application prior to the initial request, the new configuration being generated in compliance with a plurality of rules associated with execution of the software application at the geographical location identified by the geographical location metadata;

modify, with the processor, the code of the software application to change the behavior of the software application to comply with the new configuration;

configure, with the processor, the modified software application using the new configuration; and provide, with the processor through the network, the modified and configured software application to the user computing device at the geographical location.

2. The computer program product of claim 1, wherein the computer is further caused to retrieve the plurality of rules from a configuration table based on the location.

3. The computer program product of claim 1, wherein the plurality of rules comprises one or more location requirements.

4. The computer program product of claim 1, wherein the plurality of rules comprises one or more locale requirements associated with a human-spoken language.

5. The computer program product of claim 1, wherein the plurality of rules comprises one or more entity requirements corresponding to an entity associated with the software application.

6. The computer program product of claim 1, wherein the software application is a website.

7. The computer program product of claim 1, wherein the software application is a mobile application.

8. The computer program product of claim 1, wherein the computer is further caused to retrieve the configuration, without regeneration of the configuration, in response to a subsequent request the configuration from the location, the subsequent request being based on the configuration being associated with a same entity as the initial request.

9. The computer program product of claim 1, wherein the configuration is generated without pre-generating each possible alternative configuration prior to the initial request.

10. A system comprising:

a processor that receives through a network from a user computing device, geographical location metadata and an initial request to access a software application from the user computing device at a geographical location corresponding to the geographical location metadata, automatically generate, with the processor, a new configuration after the request to access the software application without pre-generating the new configuration prior to the initial request, without pre-generating a new configuration of a third party software application prior to the initial request, the new configuration being generated in compliance with a plurality of rules associated with execution of the software application at the geographical location identified by the geographical location metadata, modify, with the processor, the code of the software application to change the behavior of the software application to comply with the new configuration, configure, with the processor, the modified software application using the new configuration, and provide, with the processor through the network, the modified and configured software application to the user computing device at the geographical location.

11. The system of claim 10, wherein the processor further retrieves the plurality of rules from a configuration table based on the location.

12. The system of claim 10, wherein the plurality of rules comprises one or more location requirements.

13. The system of claim 10, wherein the plurality of rules comprises one or more locale requirements associated with a human-spoken language.

14. The system of claim 10, wherein the plurality of rules comprises one or more entity requirements corresponding to an entity associated with the software application.

15. The system of claim 10, wherein the software application is a website.

16. The system of claim 10, wherein the software application is a mobile application.

17. The system of claim 10, wherein the computer is further caused to retrieve the configuration, without regeneration of the configuration, in response to a subsequent request the configuration from the location, the subsequent request being based on the configuration being associated with a same entity as the initial request.

18. The system of claim 10, wherein the configuration is generated without pre-generating each possible alternative configuration prior to the initial request.

* * * * *